United States Patent
Munemura et al.

(10) Patent No.: US 9,403,451 B2
(45) Date of Patent: Aug. 2, 2016

(54) HEADREST DEVICE

(71) Applicant: NHK SPRING CO., LTD., Yokohama-shi (JP)

(72) Inventors: Nozomu Munemura, Yokohama (JP); Kensuke Nagai, Yokohama (JP); Tadanori Hisamoto, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 0 days.

(21) Appl. No.: 13/867,949

(22) Filed: Apr. 22, 2013

(65) Prior Publication Data

US 2013/0300166 A1  Nov. 14, 2013

(30) Foreign Application Priority Data

Apr. 23, 2012  (JP) .................................. 2012-097935

(51) Int. Cl.
*B60N 2/42* (2006.01)
*B60N 2/48* (2006.01)

(52) U.S. Cl.
CPC ............ *B60N 2/4228* (2013.01); *B60N 2/4885* (2013.01)

(58) Field of Classification Search
CPC ..................................................... B60N 2/4885
USPC ........................................... 297/216.12, 391
See application file for complete search history.

(56) References Cited

U.S. PATENT DOCUMENTS

| | | | | |
|---|---|---|---|---|
| 3,205,005 | A * | 9/1965 | Brown | 297/397 |
| 3,366,417 | A * | 1/1968 | Belk | 297/397 |
| 3,650,561 | A * | 3/1972 | Faust et al. | 297/391 |
| 5,139,310 | A * | 8/1992 | Itoh | 297/391 |
| 7,070,240 | B2 * | 7/2006 | Schmitt et al. | 297/410 |
| 7,410,218 | B2 * | 8/2008 | Kotani et al. | 297/408 |
| 7,517,009 | B2 * | 4/2009 | Mauro et al. | 297/61 |
| 7,537,282 | B2 * | 5/2009 | Veine et al. | 297/216.12 |

(Continued)

FOREIGN PATENT DOCUMENTS

| | | |
|---|---|---|
| DE | 10 2005 030313 A1 | 12/2006 |
| JP | 2006-006823 A | 1/2006 |

(Continued)

OTHER PUBLICATIONS

Extended European Search Report dated Aug. 9, 2013 issued in corresponding EP Application No. 13164405.6-1758.

(Continued)

*Primary Examiner* — David E Allred
*Assistant Examiner* — Alexander Harrison
(74) *Attorney, Agent, or Firm* — Knobbe Martens Olson & Bear LLP

(57) ABSTRACT

A headrest device comprising: a headrest stay that is coupled to an upper end portion of a seatback of a vehicle seat, and that supports a headrest pad; an internal structure that is embedded inside the headrest pad, that is supported from a rear by the headrest stay, and that supports a head of an occupant from the rear during a vehicle rear-on collision via a support face that is formed at a front face of the internal structure; and a forward projection portion that is configured by a portion of the headrest stay that projects forward, that is disposed at an upper side or a lower side of the support face within the headrest pad, and that suppresses the head supported by the support face from tilting backward or tilting forward by pivoting about the support face as a pivoting center.

9 Claims, 7 Drawing Sheets

(56) References Cited

U.S. PATENT DOCUMENTS

| | | | |
|---|---|---|---|
| 7,618,091 B2* | 11/2009 | Akaike et al. | 297/216.12 |
| 7,621,597 B2* | 11/2009 | Oda | 297/391 |
| 7,954,893 B2* | 6/2011 | Yokota et al. | 297/216.12 |
| 8,459,744 B2* | 6/2013 | Sayama | 297/408 |
| 8,596,715 B2* | 12/2013 | Yamaguchi et al. | 297/216.1 |
| 8,746,800 B2* | 6/2014 | Reel | 297/410 |
| 8,833,859 B2* | 9/2014 | Matsushima et al. | 297/391 |
| 2001/0013718 A1* | 8/2001 | Beck | 297/410 |
| 2002/0043860 A1* | 4/2002 | Dinkel et al. | 297/410 |
| 2005/0168038 A1* | 8/2005 | Kubo | 297/410 |
| 2006/0226688 A1* | 10/2006 | Terada et al. | 297/391 |
| 2006/0238010 A1* | 10/2006 | Yetukuri et al. | 297/410 |
| 2007/0176479 A1* | 8/2007 | Tabata | 297/391 |
| 2008/0265645 A1* | 10/2008 | Kasuya | 297/391 |
| 2009/0021069 A1* | 1/2009 | Hentschel et al. | 297/410 |
| 2009/0200843 A1* | 8/2009 | Yokota et al. | 297/216.12 |
| 2009/0267400 A1* | 10/2009 | Orzelski | 297/391 |
| 2010/0001570 A1* | 1/2010 | Sayama | 297/410 |
| 2010/0127548 A1* | 5/2010 | Truckenbrodt et al. | 297/391 |
| 2010/0276978 A1* | 11/2010 | Furuta et al. | 297/410 |
| 2011/0187172 A1* | 8/2011 | Reel et al. | 297/391 |
| 2011/0316318 A1* | 12/2011 | Yamaguchi et al. | 297/410 |
| 2012/0032487 A1* | 2/2012 | Yamaguchi et al. | 297/354.1 |
| 2012/0080923 A1* | 4/2012 | Kunert et al. | 297/391 |
| 2012/0098316 A1* | 4/2012 | Matsushima et al. | 297/391 |
| 2012/0104821 A1* | 5/2012 | Yetukuri et al. | 297/391 |
| 2012/0217783 A1* | 8/2012 | Enoki et al. | 297/391 |
| 2012/0235460 A1* | 9/2012 | Fey et al. | 297/410 |
| 2012/0261967 A1* | 10/2012 | Ahlbrand et al. | 297/391 |
| 2013/0049428 A1* | 2/2013 | Reel | 297/391 |
| 2014/0210243 A1* | 7/2014 | Humer | 297/391 |

FOREIGN PATENT DOCUMENTS

| | | |
|---|---|---|
| JP | 2006-69286 | 3/2006 |
| JP | 2009-189486 | 8/2009 |
| JP | 4431449 B | 12/2009 |

OTHER PUBLICATIONS

Notice of Reasons for Rejection dated Jan. 5, 2016 in corresponding Japanese Application No. 2012-097935.

* cited by examiner

HEADREST DEVICE

CROSS-REFERENCE TO RELATED APPLICATION

This application claims priority under 35 USC 119 from Japanese Patent Application No. 2012-97935 filed on Apr. 23, 2012, the disclosure of which is incorporated by reference herein.

BACKGROUND OF THE INVENTION

1. Technical Field

The present invention relates to a headrest device.

2. Related Art

In a headrest disclosed in Japanese Patent No. 4431449, a core member configured from for example a hard urethane foam is fixed at an upper end side of a stay. An upper portion of a front face of the core member is formed with a protrusion that protrudes out toward the front, and a lower portion of the front face is formed with a recess. A pad portion is made thickest at a location in front of the recess, and this thick portion of the pad secures comfort of an occupant during normal use.

However, in a rear-on collision, an upper body of the occupant is thrown toward the rear and moves upwards. A head of the occupant is thereby stably supported by the protrusion of the core member.

SUMMARY

However, in a headrest such as described above, due to the configuration in which the head of an occupant is supported during a rear-on collision by the core member made from for example hard urethane foam, there is a possibility that the head is tilted backward or tilted forward (of the head rotating backward or forward about the neck) by for example resilient deformation of the core member under load from the head. The direction and strength of such tilting of the head varies depending on a collision speed of the rear-on collision and differences in vehicle seats, however a bending moment on the neck of the occupant arises due to the backward tilting or forward tilting of the head. A value of this bending moment is either positive or negative depending on whether the head is being tilted backward or tilted forward, however protective performance of the headrest with respect to the occupant neck can be improved by reducing this absolute value (making it closer to zero).

In consideration of the above circumstances, a subject of the present invention is to obtain a headrest device that can raise protection performance with respect to the neck of an occupant.

A headrest device according to a first aspect of the present invention includes: a headrest stay that is coupled to an upper end portion of a seatback of a vehicle seat, and that supports a headrest pad; an internal structure that is embedded inside the headrest pad, that is supported from a rear by the headrest stay, and that supports a head of an occupant from the rear during a vehicle rear-on collision via a support face that is formed at a front face of the internal structure; and a forward projection portion that is configured by a portion of the headrest stay that projects forward, and that is disposed at an upper side or a lower side of the support face within the headrest pad, and that suppresses the head supported by the support face from tilting backward or tilting forward by pivoting about the support face as pivoting center.

Note that the front-rear and up-down directions in the first aspect are front-rear and up-down directions of the vehicle. Moreover, in the first aspect, a height of the headrest pad with respect to the seatback and the recline angle of the seatback are adjusted such that a central portion of a front face of the headrest pad faces a central portion of a back face of the head of the occupant from the rear. The same applies in the following explanation regarding a second aspect.

In the headrest device according to the first aspect, the head of the occupant is supported by the support face of the internal structure through the headrest pad during a vehicle rear-on collision. The forward projection portion configured by a portion of the headrest stay is disposed at the upper side or the lower side of the support face. The forward projection portion suppresses the head that is supported by the support face from tilting backward or tilting forward by pivoting about the support face. Accordingly, the direction and strength of head tilting can be controlled by setting position of a front end portion of the forward projection portion depending on a collision speed in a rear-on collision and depending on differences between vehicle seats. Since the absolute value of the bending moment arising on the neck of the occupant can be reduced, protection performance with respect to the neck can be improved as a result.

A headrest device according to a second aspect of the present invention includes: a headrest stay that is coupled to an upper end portion of a seatback of a vehicle seat, and that supports a headrest pad; an internal structure that is embedded inside the headrest pad, that is supported from a rear by the headrest stay, and that supports a head of an occupant from the rear during a vehicle rear-on collision via a support face that is formed at a front face of the internal structure; and a forward projection portion that is configured by a portion of the headrest stay that projects forward, that is disposed at an upper side or a lower side of the support face within the headrest pad, and wherein a front end portion of the forward projection portion is disposed so as to face, from the rear, the head that is supported by the support face.

In the headrest device according to the second aspect, the head of the occupant is supported by the support face of the internal structure through the headrest pad during a vehicle rear-on collision. The forward projection portion configured by a portion of the headrest stay is disposed to the upper side or the lower side of the support face, and the front end portion of the forward projection portion faces the head from the rear. The forward projection portion is accordingly able to suppress the head that is supported by the support face of the internal structure from tilting backward or tilting forward by pivoting about the support face. Accordingly, the direction and strength of head tilting can be controlled by setting position of a front end portion of the forward projection portion depending on a collision speed in a rear-on collision and depending on differences between vehicle seats. Since the absolute value of the bending moment arising on the neck of the occupant can be reduced, protection performance with respect to the neck can be improved as a result.

A headrest device according to a third aspect of the present invention is the headrest device of the first aspect or the second aspect, wherein a front end portion of the forward projection portion projects out further forward than the support face of the internal structure.

In the headrest device of the third aspect, the forward projection portion of the headrest projects out toward the front at the upper side or the lower side of the support face of the internal structure. The front end portion of the forward projection portion projects out further toward the front than the support face. The front end portion of the forward projection portion can accordingly be placed in close proximity to and facing a portion of the head of the occupant on the upper side or the lower side of a rear end portion of the head when the rear end portion of the head of the occupant, namely the portion of the head projecting furthest toward the rear, is being supported by the support face. As a result, the head can accordingly be efficiently suppressed from tilting forward or tilting backward by pivoting about the support face.

As described above, a headrest device according to the present invention is capable of improving the protection performance with respect to the neck of an occupant.

BRIEF DESCRIPTION OF THE DRAWINGS

Exemplary embodiments of the present invention will be described in detail based on the following figures, wherein.

DETAILED DESCRIPTION OF THE INVENTION

First Exemplary Embodiment

Explanation follows regarding a headrest device 10 according a first exemplary embodiment of the present invention with reference to FIG. 1 to FIG. 5. Note that in each of the drawings, an arrow FR indicates a vehicle front direction, an arrow UP indicates a vehicle upwards direction, an angle LH indicates a vehicle left hand direction, and an angle RH indicates a vehicle right hand direction as appropriate. Unless specifically indicated, when below explanation refers simply to the front-rear, up-down or left-right directions, these can be considered to be the front and rear in the vehicle front-rear direction, up and down in the vehicle up-down direction, and left and right in the vehicle left-right direction (the vehicle width direction).

Figure 1:
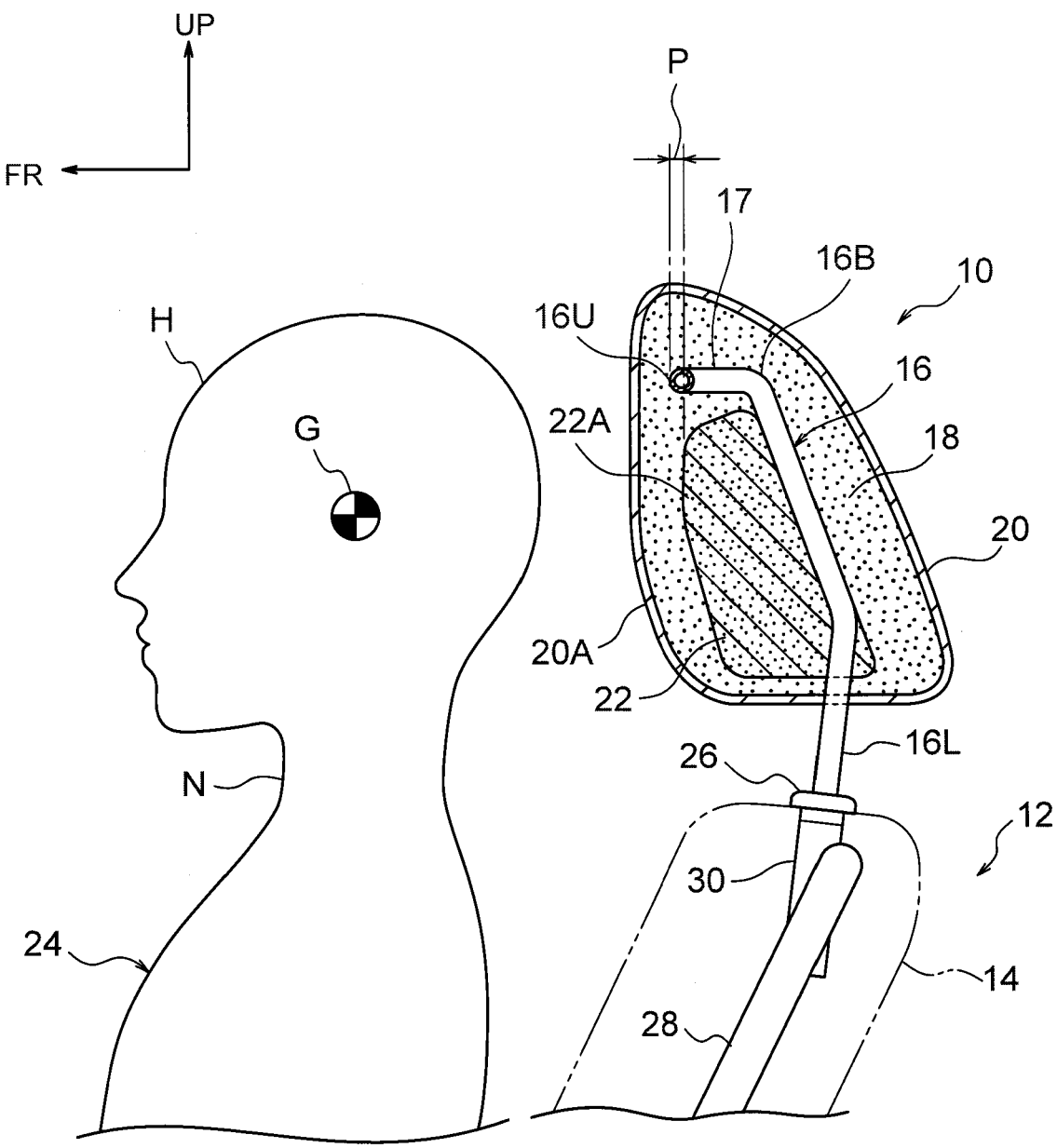
FIG. 1 is a vertical cross-section illustrating a configuration of a headrest device and members peripheral thereto according to a first exemplary embodiment of the present invention.

As shown in FIG. 1, the headrest device 10 of the present exemplary embodiment is attached at an upper end portion of a seatback 14 of a vehicle seat 12. The headrest device 10 is configured by a headrest stay 16 serving as a framework member, a headrest pad 18 that is a cushion member, a cover 20 configuring a design face, and an internal structure 22 serving as an impact absorption member.

Note that the vehicle seat 12 is coupled to a vehicle body floor section, not shown in the drawings, such that an occupant 24 sits facing the front. The front-rear, up-down and left-right directions of the vehicle seat 12 accordingly match the front-rear, up-down and left-right directions of the vehicle.

Figure 2:
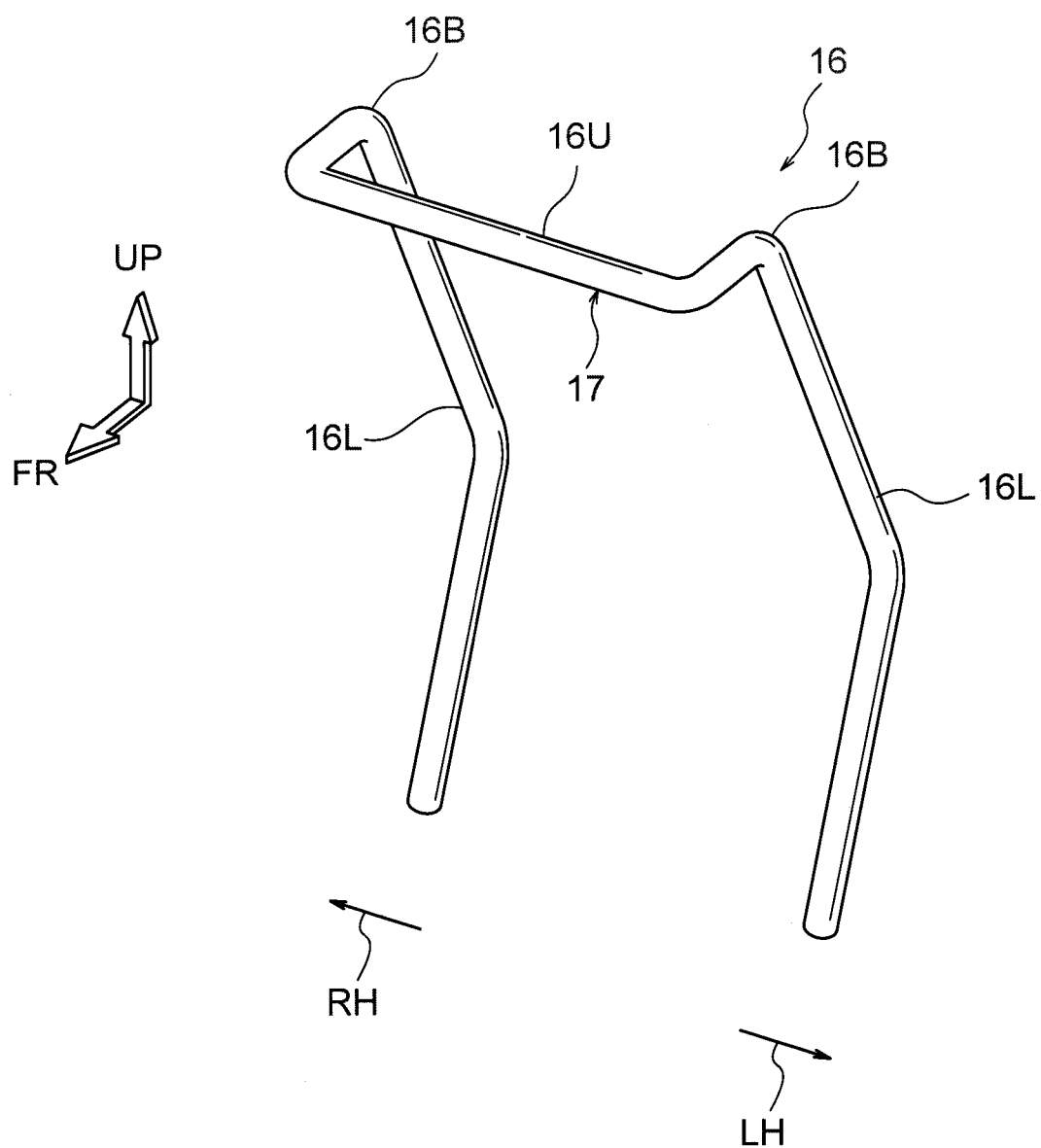
FIG. 2 is a perspective view illustrating a headrest stay of the headrest device of FIG. 1.

As shown in FIG. 2, the headrest stay 16 is formed for example by bend-working metal piping, and is formed in an inverted substantially U shape as viewed along the front-rear direction. The headrest stay 16 is configured by a left and right pair of leg portions 16L, and a connecting portion 16U that connects together upper end portions of the left and right leg portions 16L in the left-right direction. The left and right leg portions 16L are bent slightly in a vicinity of a top-bottom direction central portion as viewed from the side, as shown in FIG. 1. Upper end sides of the bent portions are inclined toward the front on progression toward an upper side.

As shown in FIG. 1, lower end sides of the left and right leg portions 16L (namely lower end sides of the headrest stay 16) are coupled to headrest supports 26 provided at an upper end portion of the seatback 14. The headrest supports 26 are mounted to headrest support brackets 30 that are fixed to an upper end portion of a seatback frame 28 that serves as a framework member of the seatback 14. The lower end sides of the headrest stay 16 are accordingly coupled to the upper end portion of the seatback frame 28 through the headrest supports 26 and the headrest support brackets 30 so as to be height-adjustable.

The headrest pad 18 is configured from a resilient foam material such as a urethane foam, and an upper end side of the headrest stay 16 is embedded in the headrest pad 18. The headrest pad 18 is accordingly supported by the headrest stay 16. The surface of the headrest pad 18 is covered by the cover 20 that is sewn into a bag shape from a material such as cloth, leather or synthetic leather. Note that in the present exemplary embodiment, the height of the headrest pad 18 with respect to the seatback 14 and a reclining angle of the seatback 14 (an angle of inclination with respect to a seat cushion, not shown in the drawings) are adjusted such that a front face central portion of the headrest pad 18 faces a central portion of a back of the head H of the occupant 24 from the rear.

The internal structure 22 is embedded inside the headrest pad 18. The internal structure 22 is formed from a hard material such as a hard urethane foam in a substantially block shape that is smaller than the headrest pad 18. The internal structure 22 is attached to the headrest stay 16 by for example fitting the left and right leg portions 16L of the headrest stay 16 into a left and right pair of vertical grooves formed on a rear face side of the internal structure 22. The internal structure 22 is thus supported from the rear side by the headrest stay 16.

The front face of the internal structure 22 is formed with a curved face shape following a front face portion 20A of the cover 20. A portion of substantially uniform thickness of the headrest pad 18 is interposed between the front face of the internal structure 22 and the front face portion 20A. A support face 22A provided at an upper portion side of the front face of the internal structure 22 is disposed at a substantially equivalent height to the center of gravity G of the head H of the occupant 24. The height of the center of gravity G is at substantially the same height as a rearmost end portion of the head H of the occupant 24, namely the portion of the head H that protrudes furthest toward the rear.

Figure 3:
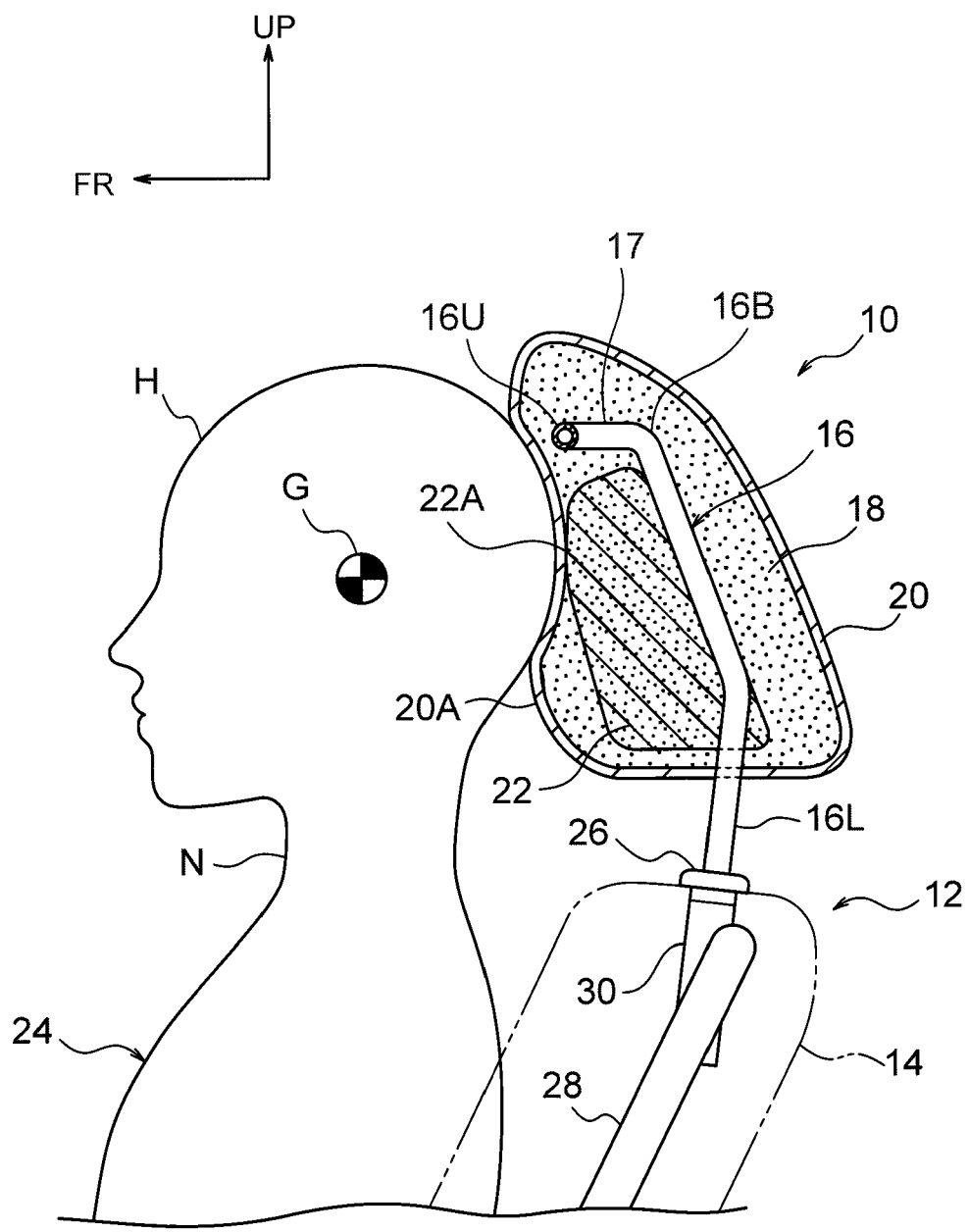
FIG. 3 is a vertical cross-section corresponding to FIG. 1 illustrating a state in which the head of an occupant is supported from a rear side by a support face of an internal structure.

Accordingly, as shown in FIG. 3, configuration is made such that when the vehicle is involved in a rear-on collision, the headrest pad 18 is squashed under load from the head H of the occupant 24 moving toward the rear under inertia, and a rear end portion of the head H is supported from the rear by the support face 22A of the internal structure 22 (the head H receives a reaction force toward the front from the support face 22A).

Note that during manufacture of the headrest device 10, the upper end side of the headrest stay 16 to which the internal structure 22 is attached is inserted inside the cover 20 and set in a mold, not shown in the drawings. Integral molding is performed in this state by injecting a foaming material for the headrest pad 18 into the cover 20 and causing the material to foam and expand.

In the present exemplary embodiment, the upper end portions of the left and right leg portions 16L of the headrest stay 16 are bent toward the front. A forward projection portion 17 is formed thereby at the upper end portion of the headrest stay 16. The forward projection portion 17 is configured by portions of the left and right leg portions 16L and the connecting portion 16U. The portions of the left and right leg portions 16L extend further toward a connecting portion 16U side from bent portions 16B positioned at upper end portions of the left and right leg portions 16L. The forward projection portion 17 is formed in a substantially U-shape that is open toward the rear as viewed in plane view. The forward projection portion 17 is configured by a portion of the headrest stay 16, and is accordingly the same rigid body as the headrest stay 16.

The forward projection portion 17 described above is disposed further at an upper side than the internal structure 22, and projects out toward the front (to the front face portion 20A side). A front end portion of the forward projection portion 17 (the coupling portion 16U) projects out slightly further to the front than the front end of the support face 22A. The position of the connecting portion 16U is configured such that a front end portion of the connecting portion 16U is at a position facing the head H that is supported by the support face 22A from the rear in the rear-on collision as described above. Namely, the front end portion of the connecting portion 16U is at a position that suppresses the head H supported by the support face 22A from tilting backward by pivoting about the support face 22A. Detailed explanation follows regarding setting the position (placement) of the forward projection portion 17.

Figure 4:
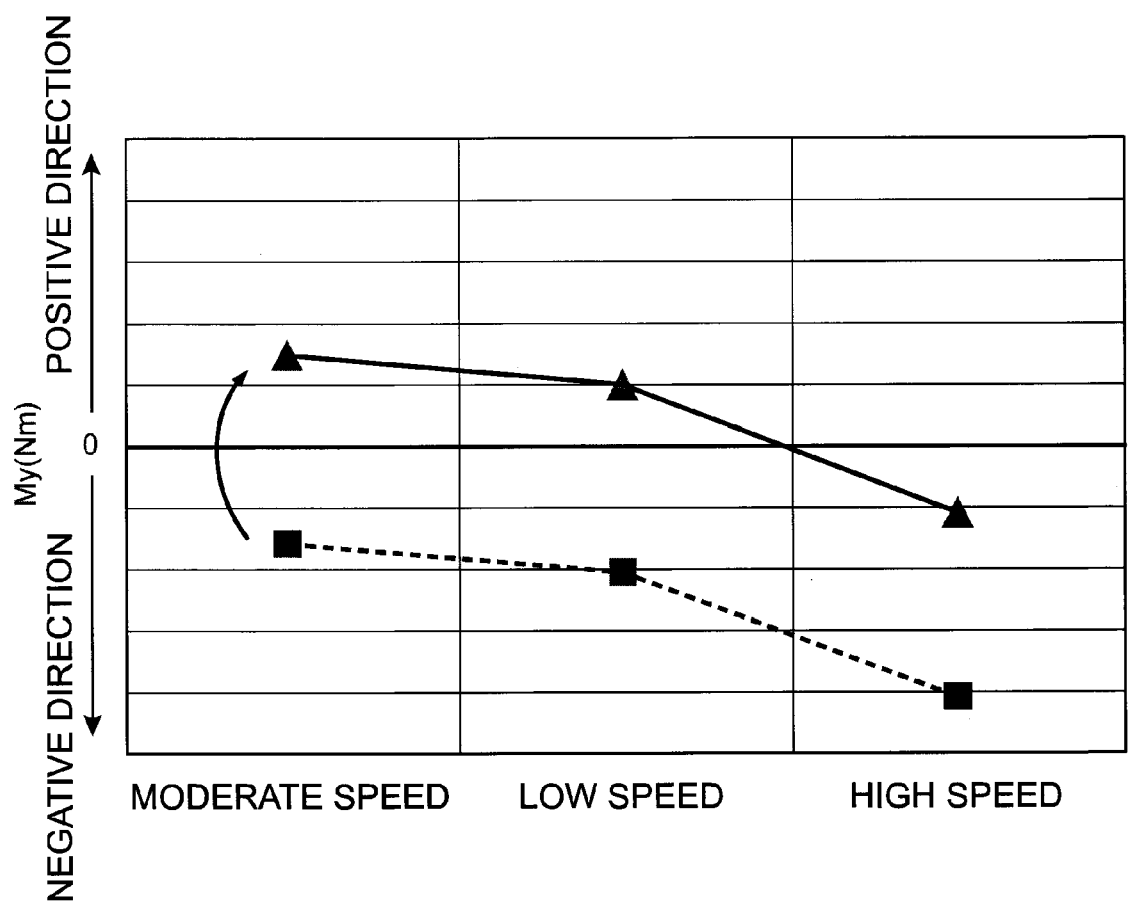
FIG. 4 is a graph illustrating relationships between collision speed in a rear-on collision and a bending moment (My) arising on the neck of an occupant.

During a rear-on collision, a bending moment (My) arises on a neck of the occupant 24 due to the head H of the occupant 24 tilting backward or tilting forward. The value of the bending moment (My) varies depending on the collision speed of the rear-on collision, and on differences in the vehicle seat structure. For example, the broken line in FIG. 4 shows the bending moment (My) in a case for a vehicle seat 12 of the present exemplary embodiment that however, does not have the upper end portion of the headrest stay 16 bent toward the front and that has the forward projection portion 17 omitted (referred to below as the Comparative Example). The moderate speed, low speed and high speed shown in FIG. 4 illustrate differences in the collision speed in a rear-on collision.

Figure 5A:
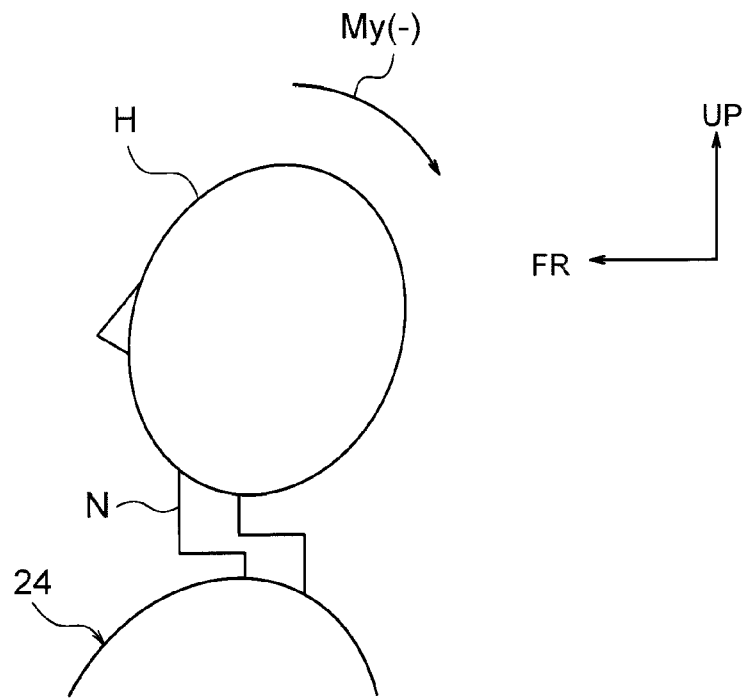
FIG. 5A is a schematic side view to explain a situation in which a bending moment on the neck of an occupant is negative.
Figure 5B:
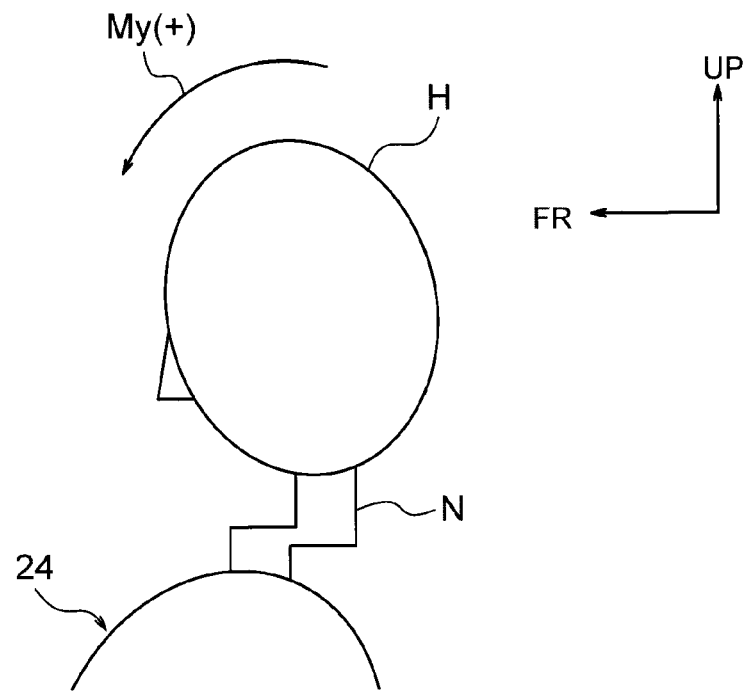
FIG. 5B is a schematic side view to explain a situation in which a bending moment on the neck of an occupant is positive.

As shown in FIG. 4, the bending moment (My) is unevenly distributed at a negative side in the Comparative Example. Note that as shown in FIG. 5A, when the bending moment (My) is negative, the head H of the occupant 24 is tilted backward so as to raise a chin (make the chin stick out). However, as shown in FIG. 5B, when the bending moment (My) is positive, the head H of the occupant 24 is tilted forward such that the chin is pulled in.

In other words, in the Comparative Example described above, the head H of the occupant 24 tends to be tilted backward such that the chin is raised no matter whether the collision speed is a moderate speed, a high speed, or a low speed.

Moreover, as shown in FIG. 4, in the Comparative Example described above, it is liable that bending moment (My) values increases in the sequence of moderate speed, low speed, and high speed. Protective performance for the neck N can be improved the closer the bending moment (My) is to zero.

In the vehicle seat 12 according to the present exemplary embodiment, the position of the forward projection portion 17 is determined so as to make the bending moment (My) closer to zero in all three speeds of the above collision. For example the position in the up-down direction of the forward projection portion 17 is set at a position in a region of tens of mm higher that the center of gravity G of head H of the occupant 24. Moreover, the position in the front-rear direction of the front end of the forward projection portion 17 is set at a position projecting out in a region of several mm further to the front than the front end of the support face 22A of the internal structure 22 (see arrows P in FIG. 1). Note that, configuration is furthermore made such that when the head H of the occupant 24 is supported by the support face 22A of the internal structure 22 (the state illustrated in FIG. 3), the front end portion of the forward projection portion 17 is disposed in a region of several mm away from the head H.

Explanation follows regarding operation and advantageous effects of the present exemplary embodiment.

In the headrest device 10 configured as described above, when the vehicle is involved in a rear-on collision, the headrest pad 18 is squashed under load from the head H of the occupant 24 moving toward the rear under inertia, and the head H is supported from the rear by the support face 22A of the internal structure 22. The forward projection portion 17 provided to the upper end portion of the headrest stay 16 is disposed at the upper side of the support face 22A, with the front end portion of the forward projection portion 17 facing the head H from the rear. Accordingly, when the head H that is supported by the support face 22A attempts to tilt backward by pivoting about the support face 22A, the backward tilt of the head H is suppressed due to the forward projection portion 17 supporting the head H further at the upper side than the center of gravity G of the head H.

Moreover, in the present exemplary embodiment, the front end portion of the forward projection portion 17 of the headrest stay 16 projects out further toward the front than the support face 22A. Accordingly, as shown in FIG. 3, when the rear end portion of the head H is being supported by the support face 22A, the front end portion of the forward projection portion 17 can be placed in close proximity to and faces a portion of the head H further at the upper side than the rear end portion of the head H. Backward tilting of the head H pivoting about the support face 22A can accordingly be efficiently suppressed as a result.

Accordingly, since in the present exemplary embodiment, the head H can be suppressed from tilting backward due to pivoting about the support face 22A, the bending moment (My) can be brought closer to zero for each of the moderate, low, and high collision speeds as shown by the solid line in FIG. 4. Protection performance for the neck N can be improved as a result.

Note that in the exemplary embodiment described above, explanation has been given regarding a case in which the present invention is applied to the Comparative Example (vehicle seat) in which the bending moment (My) is unevenly distributed at the negative side, however there is no limitation thereto. According to the present invention, the direction and strength of head tilting can be controlled by setting the position of the front end portion of the forward projection portion depending on the collision speed in a rear-on collision and on differences in the vehicle seat.

In the second exemplary embodiment below, explanation is given to a case in which the present invention is applied to a vehicle seat in which the bending moment (My) is unevenly distributed at a positive side (namely, a vehicle seat in which the head of an occupant tends to be tilted forward so as to pull in the chin in a rear-on collision). Note that configuration and operation that is basically the same as that of the first exemplary embodiment is allocated the same reference numerals as in the first exemplary embodiment, and explanation thereof is omitted.

Second Exemplary Embodiment

Figure 6:
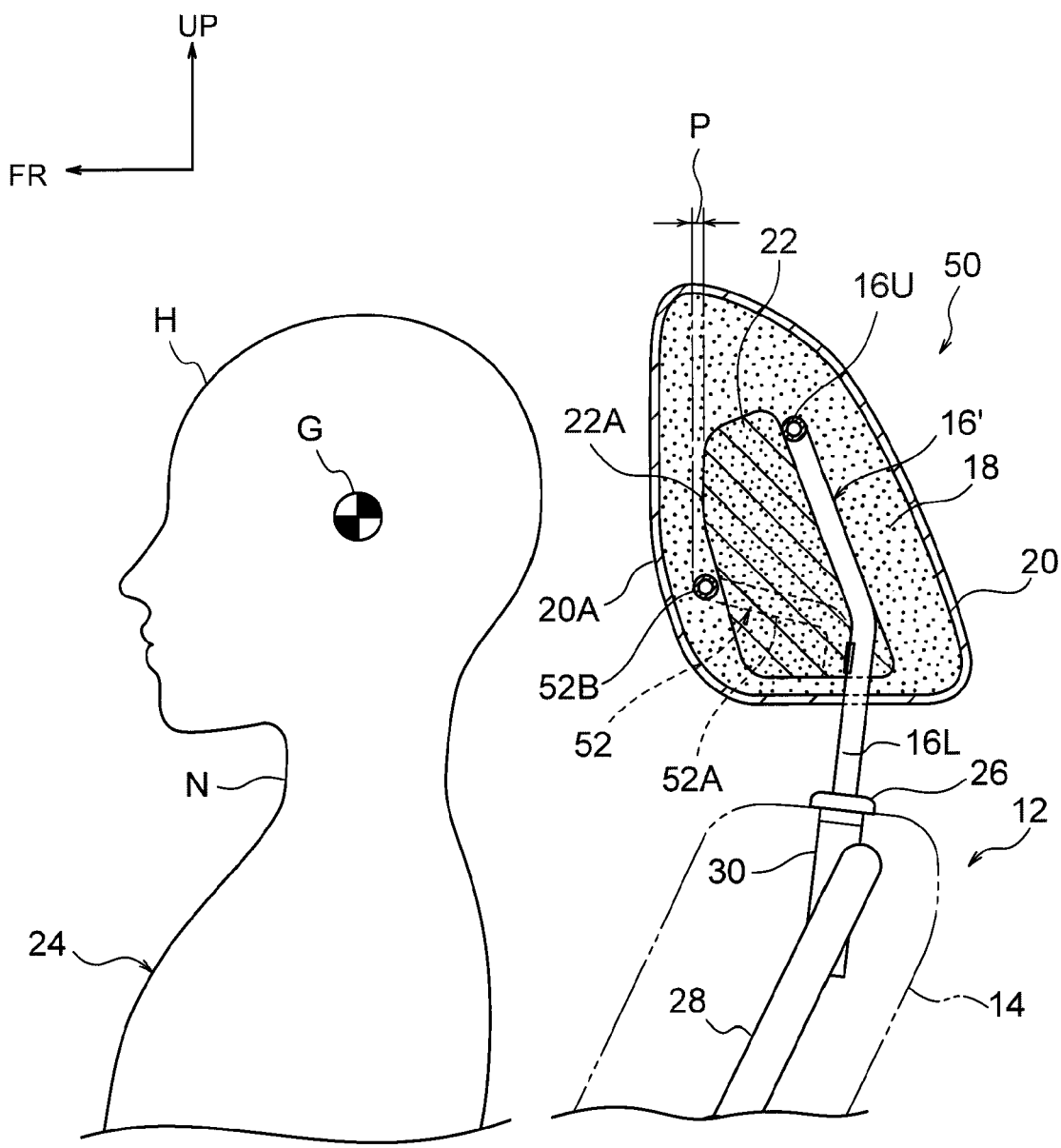
FIG. 6 is a vertical cross-section illustrating a configuration of a headrest device and members peripheral thereto according to a second exemplary embodiment of the present invention.

FIG. 6 is a vertical cross-section as viewed from the vehicle width direction outside, illustrating a configuration of a headrest device 50 and members peripheral thereto according to the second exemplary embodiment of the present invention. The configuration of the present exemplary embodiment is basically the same as in the first exemplary embodiment, however the forward projection portion 17 of the first exemplary embodiment is omitted from a headrest stay 16' of the present exemplary embodiment. Namely, an upper end portion of the headrest stay 16' is not bent toward the front, and a connecting portion 16U is positioned to the rear from an upper end portion of an internal structure 22.

Moreover, in the headrest stay 16', a forward projection portion 52 that configures a portion of the headrest stay 16' is fixed at an up-down direction intermediate portion of left and right leg portions 16L. The forward projection portion 52 is formed for example by bend-working metal piping, and is configured by a left and right pair of front extension portions 52A that extend toward the front from the up-down direction intermediate portion of the left and right leg portions 16L, and a connecting portion 52B that connects together front end portions of the left and right front extension portions 52A in the left-right direction. Rear end portions of the left and right front extension portions 52A are bent toward the lower side and are joined to the up-down direction intermediate portions of the left and right leg portions 16L by a method such as welding. The forward projection portion 52 and the left and right leg portions 16L are thereby integrated together. Moreover, the connecting portion 52B, namely a front end portion of the forward projection portion 52, extends in the left-right direction along the front face of the internal structure 22 at a lower side of a support face 22A of the internal structure 22 (namely at the lower side of the center of gravity G of the head H). The coupling portion 52B also projects out slightly further toward the front (for example in a region of several mm) than the support face 22A (see the arrows P in FIG. 6).

Figure 7:
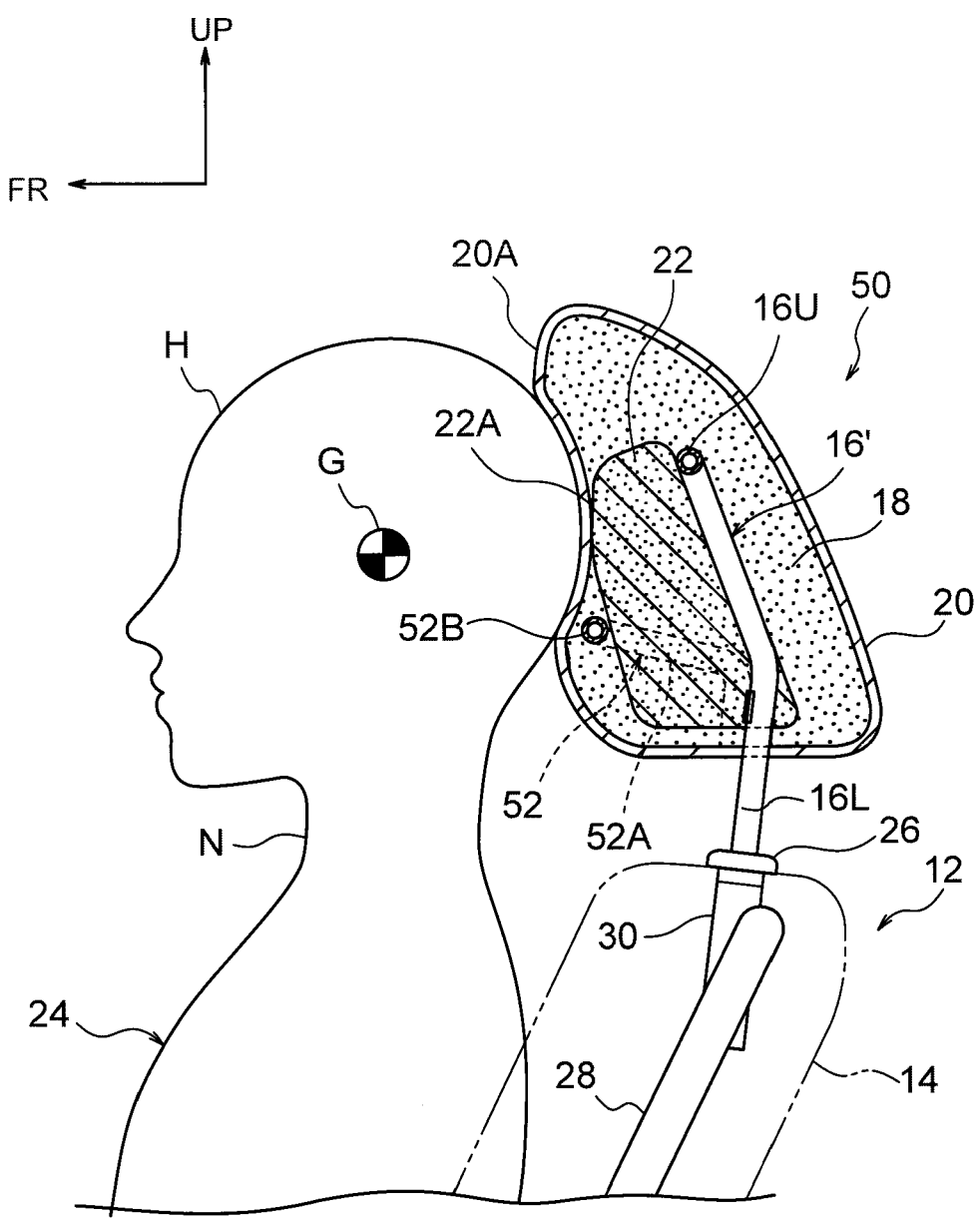
FIG. 7 is a vertical cross-section corresponding to FIG. 6 and illustrating a state in which the head of an occupant is supported from the rear side by a support face of an internal structure.

As shown in FIG. 7, in the present exemplary embodiment, when the vehicle is involved in a rear-on collision, a headrest pad 18 is squashed under load from the head H of an occupant 24 moving toward the rear under inertia, and the head H is supported from the rear by the support face 22A of the internal structure 22. The forward projection portion 52 that is provided to the up-down direction intermediate portions of the headrest stay 16' is disposed at the lower side of the support face 22A, with the front end portion of the forward projection portion 52 facing the head H from the rear. When the head H that is supported by the support face 22A attempts to tilt forward by pivoting about the support face 22A, the head H is accordingly supported by the forward projection portion 52 at the lower side of the center of gravity G of the head H, thereby suppressing the head H from tilting forward.

Moreover, in the present exemplary embodiment, the front end portion of the forward projection portion 52 of the headrest stay 16' projects out further toward the front than the support face 22A. As shown in FIG. 7, when the rear end portion of the head H is being supported by the support face 22A, the front end portion of the forward projection portion 52 can be placed in close proximity to and faces a portion of the head H at the lower side of the rear end portion of the head H. Forward tilting of the head H due to pivoting about the support face 22A can be efficiently suppressed as a result.

Since in the present exemplary embodiment, the head H can thus be suppressed from tilting forward by pivoting about the support face 22A, the bending moment (My) can be brought closer to zero for each of the moderate, low and high collision speeds. Protection performance for the neck N can be improved as a result.

Note that in each of the above exemplary embodiments, the front end portions of the forward projection portions 17, 52 are configured projecting further toward the front than the support face 22A of the internal structure 22. However the present invention is not limited thereto, and configuration may be made wherein the front end portion of the forward projection portion is disposed further toward the rear than the support face of the internal structure.

Various other modifications may be implemented in the present invention within a scope not departing from the gist of the present invention. Moreover, the scope of the present invention is obviously not limited by each of the exemplary embodiments described above.

What is claimed is:

1. A headrest device comprising:
   a headrest stay that is coupled to an upper end portion of a seatback of a vehicle seat, and that supports a headrest pad;
   an internal structure that is made of foam, that is embedded inside the headrest pad, and that is supported from a rear by the headrest stay, the internal structure having a support face facing a vehicle front direction when the seatback is in an upright position so as to support the head of the occupant from the rear during a vehicle rear-on collision; and
   a forward projection portion that is configured by a portion of the headrest stay that projects in the vehicle front direction above the internal structure, and that suppresses the head supported by the support face from tilting backward, which is caused by the head by pivoting about the support face as a pivoting center,
   wherein a front end portion of the forward projection portion projects further in the vehicle front direction than the entire support face of the internal structure when the seatback is in the upright position, and
   the forward projection portion is a same rigid body as the headrest stay.

2. A headrest device comprising:
   a headrest stay that is coupled to an upper end portion of a seatback of a vehicle seat, and that supports a headrest pad;
   an internal structure that is embedded inside the headrest pad, that is supported at a surface facing a vehicle rear direction by the headrest stay, and that is configured to support a head of an occupant from the rear during a vehicle rear-on collision via a support face that is formed at a surface opposite to that supported by the headrest stay of the internal structure; and
   a forward projection portion that is disposed at a lower side of the support face within the headrest pad, and wherein a front end portion of the forward projection portion is disposed so as to face, from the vehicle rear direction, the head that is supported by the support face,
   wherein the internal structure is foam, the front end portion of the forward projection portion is configured to project out further to the vehicle front direction than the entire support face of the internal structure when the headrest stay is coupled to the seatback of the vehicle seat, the forward projection portion is a same rigid body as the headrest stay, the headrest stay and the forward projection portion are independent structures which are attached together by welding the forward projection portion to the headrest stay.

3. The headrest device of claim 1, wherein a dimension of a cross-sectional face of the forward projection portion is the same as a dimension of a cross-sectional face of the headrest stay.

4. The headrest device of claim 2, wherein a dimension of a cross-sectional face of the forward projection portion is the same as a dimension of a cross-sectional face of the headrest stay.

5. The headrest device of claim 1, wherein the internal structure has a block shape.

6. The headrest device of claim 2, wherein the internal structure has a block shape.

7. The headrest device of claim 1, wherein the foam is urethane.

8. The headrest device of claim 2, wherein the foam is urethane.

9. A headrest device comprising:

a headrest stay that is coupled to an upper end portion of a seatback of a vehicle seat, and that supports a headrest pad;

an internal structure that is made of foam, that is embedded inside the headrest pad, and that is supported from a rear by the headrest stay, the internal structure having a support face facing a vehicle front direction so as to support the head of the occupant from the rear during a vehicle rear-on collision; and a forward projection portion that is configured by a portion of the headrest stay that projects in the vehicle front direction above the internal structure, and that suppresses the head supported by the support face from tilting backward, which is caused by the head by pivoting about the support face as a pivoting center, wherein a front end portion of the forward projection portion projects further in the vehicle front direction than the entire support face of the internal structure when a reclining angle of the seatback is adjusted such that the support face of the internal structure is substantially vertical, and the forward projection portion is a same rigid body as the headrest stay.

* * * * *